United States Patent Office 3,210,266
Patented Oct. 5, 1965

3,210,266
PROCESS FOR PREPARING SILICA ALUMINA CATALYST AND CATALYST PREPARED THEREBY
Malden W. Michael, Stamford, Conn., and Robert M. De Baun, Wayne, N.J., assignors to American Cyanamid Company, Stamford, Conn., a corporation of Maine
No Drawing. Filed Sept. 24, 1962, Ser. No. 225,863
6 Claims. (Cl. 208—120)

This invention relates to a process for preparing catalysts employed in hydrocarbon conversion processes and to the catalysts so prepared. This invention also relates to such hydrocarbon conversion processes employing catalysts so prepared. In a more particular aspect, the present invention relates to a process for improving the useful properties of catalysts derived from kaolin clays.

It is well known that hydrocarbon conversion catalysts for use in commercial applications may be derived from various clays. Of particular interest have been types of clays such as montmorillonites and bentonites. On the other hand, kaolin clays although commercially available and more abundantly distributed, have not achieved as wide commercial acceptance as the montmorillonites and bentonites principally because of diminished catalytic activity. In order to improve the catalytic activity of kaolin clays and other comparatively inert and inactive natural occurring silicates of alumina, acid treatment of the same has usually been resorted to. Since the general formula for kaolin clays is $Al_2O_3 2H_2O 2SiO_2$, it is noted that kaolin clays offer a readily available source of catalysts whose principal components are silicia and alumina. At least four distinct types of kaolin are usually identified as such, namely, kaolinite, dickite, nakrite and anauxite, and, as the term is employed herein, kaolin is intended to embrace all four types all of which may sometimes be found admixed with certain small percentages of montmorillonite. In addition to the silica alumina components, the kaolin clays also may contain minor amounts of other components, particularly, iron, calcium, magnesium or alkali metals. Depending upon the source of the kaolin, the amounts of such components, and of silica and alumina within the kaolin will vary slightly.

Synthetic silica alumina catalysts are also well known for use in catalytic reactions such as cracking, dehydrogenation and other hydrocarbon conversion operations. Such cracking catalysts, however, ordinarily lose activity and thereby have to be replaced in order to maintain efficient operation. Were a more stable silica alumina catalyst available, longer activity for the same would be found and, of course, the charge in a hydrocarbon conversion unit would not have to be replaced as often.

One of the criterions for determining stability of silica alumina catalysts is the activity of the catalyst after steaming. Generally, virtually all synthetic silica alumina catalysts lose up to about 65% of their initial or fresh activity when steamed. If the property of increased activity or at least the same activity after steaming were present in a silica alumina catalyst, the need for replacement of the catalyst in a hydrocarbon conversion unit would, of course, be drastically lowered.

We have now discovered a process for preparing a silica alumina catalyst which is derived from a naturally occurring kaolin and which has exceptional activity after steaming. Because the kaolin is employed to furnish the silica content in the silica alumina catalyst of our invention, it will be readily seen that the catalyst so prepared is markedly less costly to manufacture than a silica alumina catalyst obtained synthetically such as, for example, from a hydrated alumina deposited on a hydrated silica gel. In addition, kaolin clays utilized in accordance with our invention offer additional advantages incident to their comparatively high densities, accompanying high heat capacity and high temperatures of incipient fusion.

In accordance with the present invention, we have unexpectedly found the following process for preparing a modified kaolin catalyst. A naturally occurring kaolin is digested with an inorganic acid so as to remove about 75 to about 90% of the $Al_2O_3$ content. Following the digestion step, the digestion mass is allowed to settle and the supernatant liquid containing aluminum salts together with other metallic salts which have been removed during the digestion step are removed. To the residue, now containing an $Al_2O_3$ deficient kaolin, is added sufficient aqueous aluminum salt solution so as to provide and $Al_2O_3$ content of about 25 to about 40% and a $SiO_2$ content of about 60 to about 75% in the final catalyst. $Al_2O_3$ is then precipitated on the residue by the addition of ammonia while maintaining the pH at between about 5.5 to about 7.5. Subsequently, the catalyst is washed and dried in a conventional manner.

It will thus be seen that the process essentially involves employing an inorganic acid, usually sulfuric acid, in a large amount in order to remove most of the soluble alumina and trace metallic constituents from the kaolin clay and subsequently impregnating the digested clay residue with an aluminum salt whereby alumina is precipitated onto the treated clay. In such a manner, an improved silica alumina catalyst which is essentially a modified kaolin catalyst is obtained.

The theoretical explanation underlying the obtaining of a silicia alumina catalyst such as we have obtained which possesses superior activity after steaming is not completely understood. However, it is believed that the alumina found present in the kaolin is not all in an active form for use as a catalyst. However, upon acid activation, whereupon a substantial portion of the alumina and impurities are removed, a kaolin clay having increased activity is obtained. This activated kaolin clay which may perform as a catalyst itself in hydrocarbon conversion processes serves as a carrier for the alumina which is deposited on the clay residue during one of the subsequent steps of our process. During the impregnation of the kaolin clay residue with an aluminum salt and precipitation of the alumina from the salt solution onto the residue itself, it is believed that intramolecular bonding forces are set up whereupon increased catalytic activity is also simultaneously obtained.

The catalysts obtained may be employed in the form of a finely divided power or microspheres in fixed or moving bed processes or the catalyst may be later found to be easily formed into larger aggregates such as pills, pellets, granules and the like suitable for use generally in fixed bed processes.

The extent of acid treatment of the clay is generally governed by such factors as concentration, time and temperature and the $Al_2O_3$ content of the kaolin clay being treated. However, such acid treatment must be sufficient at least to extract from about 75 to about 90% of $Al_2O_3$ from kaolin. While removal of less than about 75% of the $Al_2O_3$ content of the clay is not precluded, it has been found that catalysts of extremely high activity after steaming are obtained when about 75 to about 90% of the original $Al_2O_3$ content is removed and $Al_2O_3$ is subsequently redeposited from an aluminum salt solution in the succeeding step.

It will be readily understood that depending upon the kind of acid used, the dilution of acid, the ratio of acid to clay and the temperature of treatment, the rate at which the $Al_2O_3$ is extracted from the kaolin clay will vary widely. The acid treatment may be effected by adding an inorganic acid such as hydrochloric acid, nitric acid or sulfuric acid, and preferably the latter, of moderate to strong concentration to an aqueous slurry of kaolin clay by adding the slurry to the acid. Alternatively, dilute acid may be added directly to the raw or dry clay. The weight ratio of acid to dry clay may be from about 20 to about 100% although higher ratios may also be employed. Ratios in the range of about 60 to about 100% are preferred. Treatment of kaolin clay with acid is preferably carried out at an elevated temperature at from about 150° F. to about the boiling point of the acid mixture. The clay may be permitted to soak in the acid or any known leaching or extracting procedure may be employed. Following the acid treatment step, the clay residue after separation from the filtrate may be washed with water in order to remove soluble aluminum and other metallic salts, e.g., calcium, magnesium and iron salts. In some instances, the washing step may be eliminated.

After the acid leaching or extracting step, alumina is deposited on the kaolin clay residue by precipitating the alumina from an aqueous aluminum salt solution, e.g., a solution of aluminum chloride, aluminum nitrate or aluminum sulfate, and preferably the latter, in which the residue is dispersed by means of aqueous ammonia. Following the precipitation of alumina, the mixture is filtered, washed free of salts, dried and ground. To deposit alumina on the kaolin residue, usually an amount of aqueous aluminum sulfate solution is mixed with the residue so as to give about 25 to about 40% alumina when the alumina is later deposited on the kaolin residue. The amount of aluminum sulfate solution added, of course, is varied depending upon the desired level of alumina in the finished catalyst. Generally, however, aluminum salt solutions are employed the alumina concentration of which is from about 5 to about 10%.

Ordinarily, a slight excess of that theoretically required of aqueous ammonium hydroxide, usually about 10 to about 15% concentration, is used to precipitate alumina from the aluminum sulfate at a pH of from about 5.5 to about 7.5, preferably about 6.5 to 7.0. The mixture is then washed with a slightly alkaline wash water by decantation. Instead of decanting the clay mixture, it may be filtered and washed. The washed treated kaolin residue containing alumina is then filtered and the treated residue containing alumina may be still further washed. Upon filtration, the residue containing alumina may be washed with slightly alkaline water or demineralized water. The treated residue containing alumina is then dried at about 200 to about 250° F. for about sixteen hours. The drying time is not critical and shorter times and somewhat higher temperatures may be used. The dried, treated kaolin residue containing alumina is then pilled and heated at about 350 or about 370° C. for three hours to drive off volatiles. While the last heating step is not essential, it is preferably used to activate the catalyst for use in a catalytic conversion operation. Instead of pilling the steamed clay residue containing alumina, it may be reduced to powder and mixed with hydrocarbons to be converted.

Alternatively, the alumina containing residue may be, and preferably is, rapidly dried by spray drying, flash drying or other suitable rapid drying technique. Spray drying is preferred in that large amounts of material may be processed in relatively short periods of time. Any suitable spray drier may be used. One that has been employed with good results is described in United States Patent No. 2,644,516, dated July 7, 1953. Although gas inlet temperatures of up to 1300° F. have been used successfully, the temperature of the drying gases entering the spray drying chamber is preferably controlled within the range of about 500 to 1000° F. so that the catalyst material, i.e., kaolin residue upon which alumina has been precipitated, will be converted into microspheres during the drying procedure. The spray dried microspheres may then be employed in a fluid bed catalytic converter.

In order to illustrate the present invention the following non-limiting examples are given:

EXAMPLE A

Eight thousand and seventy-five parts of a 48.5° Baumé slip of Andersonville kaolin clay (46.4% ignited solids) at 105° F. are added to 7400 parts of 98% sulfuric acid at 160° F. in a suitable digestor equipped with agitator. A maximum temperature of 280° F. is reached after twenty minutes while temperatures of 240° F. and 225° F. after one and two hours, respectively, are subsequently noted. After a total 2.5 hours acid digestion period, dilution water and flocculating agent are added to the digestor. The batch is then pumped to a settling tank and after six hours, the alum extract solution is pumped from the tank leaving the clay residue. The alum solution is analyzed and is found to contain 6.61% $Al_2O_3$, 0.64% $H_2SO_4$ and .031% Fe. The clay residue is analyzed and is found to contain 22.0% $Al_2O_3$ and 0.481% Fe. Approximately 79% of the alumina is removed from the kaolin clay by this procedure.

EXAMPLE 1

625 grams of the washed residue (containing 260 grams solids) of A is added to 12 pounds water at 40° C. and thoroughly dispersed. To this is added 800 grams alum in 1200 grams water. Fourteen percent ammonia is added with good mixing to a pH of 7 to precipitate the alumina. The mixture is filtered, washed free of harmful salts, dried at 250° F. and ground minus 40 mesh. The finished catalyst contained 35% added $Al_2O_3$ on solids basis.

EXAMPLE 2

1000 grams of the unwashed residue (containing 400 grams solids) of A is added to 12 pounds water at 65° C. and dispersed. To this is added 775 grams alum in 1155 grams water to add 25% alumina to the residue. The alumina is precipitated onto the residue by the addition of 14% ammonia to a pH of 7. The precipitation is filtered, washed free of salts, dried at 250° F. and ground to pass 40 mesh.

EXAMPLE 3

In this example, the washed residue of A is calcined for 1 hour at 1400° F. before use.

240 grams of the calcined residue is added to 12 pounds water of 50° C. and dispersed. To this is added 915 grams alum in 1385 grams water to add 40% alumina to the residue. The alumina is precipitated onto the residue by the addition of 14% ammonia solution to a pH of 7. The preparation is filtered, washed free of salts, dried at 250° F. and ground to pass 40 mesh.

EXAMPLE 4

1320 grams of unwashed residue (240 grams solids) of A is added to 12 pounds water at 50° C. To this is added 915 grams alum in 1385 grams water to add 40% alumina to the residue. The alumina is precipitated onto the residue by the addition of 14% ammonia to a pH of 7. The preparation is filtered, washed free of salts, dried at 250° F. and ground to pass 40 mesh.

EXAMPLE 5

This is a conventional synthetic silica alumina catalyst containing 25% alumina, no residue, for comparative purposes.

These catalsts were tested for activity using the AGC procedure as described in the "Test Methods for Synthetic Fluid Cracking Catalyst" compiled by American Cyanamid Company, Refinery Chemicals Department. Test results are shown in the table hereinafter.

*Table*

| Catalyst of Example | Activity | | Gas Factor | | Carbon Factor | |
|---|---|---|---|---|---|---|
| | Fresh | Steamed | Fresh | Steamed | Fresh | Steamed |
| 1 | 44.2 | 59.4 | 1.95 | 1.27 | 4.1 | 2.0 |
| 2 | 34.5 | 42.0 | 2.2 | 1.9 | 8.0 | 3.7 |
| 3 | 42.6 | 52.1 | 1.82 | 1.55 | 5.4 | 2.8 |
| 4 | 44.3 | 53.2 | 2.29 | 1.39 | 7.0 | 3.3 |
| 5 | 91.4 | 54.8 | 1.08 | 1.0 | 1.53 | 1.57 |

The results appearing in the table demonstrate that the completely synthetic catalyst (that of Example 5) is considerably more active fresh than it is after steaming for 17 hours at 750° C. and one atmosphere steam. Thus, after steaming 40% of the initial activity of the synthetic catalyst is lost. By contrast, however, the catalysts of this invention (those of Examples 1 to 4, inclusive) are markedly more active after steaming for 17 hours at 750° C. and one atmosphere than they are fresh and unsteamed. Thus, the catalysts of Examples 1 to 4, inclusive, are increased in activity by approximately 20 to 40% after steaming.

While the present invention has been described in conjunction with certain illustrative embodiments, it is to be understood that the invention is to be construed broadly and that it is limited only by the appended claims since numerous modifications thereof will be readily apparent to those skilled in the art.

We claim:
1. A process for preparing a silica alumina catalyst, which has improved activity upon steaming and has substantially all of the silica content and a minor portion of the alumina content thereof derived from a kaolin, said process comprising:
    (1) digesting kaolin with an inorganic acid unit from about 75% to about 90% of the $Al_2O_3$ content of said kaolin is leached therefrom, thereby forming an aluminum salt-containing supernatant solution, and thereby producing a residue comprising acid-treated kaolin;
    (2) separating said residue from said supernatant solution;
    (3) mixing said separated residue with an aqueous aluminum salt solution, and thereby forming a mixture;
    (4) maintaining the pH of said mixture at between about 5.5 and about 7.5 during precipitation, said pH being sufficient to precipitate $Al_2O_3$ from said aqueous solution;
    (5) separating from said mixture, said precipitate-containing kaolin residue; and
    (6) washing and drying said separated precipitate-containing residue.

2. A process as in claim 1 in which the amount of aluminum salt employed is such as to provide an alumina content of from about 25 to about 40% in the catalyst.

3. A process as in claim 2 in which the inorganic acid is sulfuric acid.

4. A process as in claim 3 in which the aluminum salt is aluminum sulfate.

5. A silica alumina catalyst having improved activity subsequent to steaming said catalyst, comprising a predominantly kaolin-derived silica content, and a minor amount of kaolin-derived alumina, said catalyst being prepared by a process comprising:
    (1) digesting kaolin with sulfuric acid until from about 75% to about 90% of the $Al_2O_3$ content of said kaolin is leached therefrom forming an aluminum salt-containing supernatant solution, producing a residue comprising acid-treated kaolin;
    (2) separating said residue from said leaching acid and from said supernatant solution;
    (3) mixing said separated residue with an aqueous aluminum sulfate solution, and thereby forming a mixture;
    (4) adding ammonia to said mixture, said ammonia addition being in an amount sufficient to substantially maintain the pH of said mixture between about 5.5 and about 7.5, thereby precipitating $Al_2O_3$ from said aqueous solution;
    (5) separating from said mixture, said precipitate-containing kaolin residue; and
    (6) washing and drying said separated precipitate-containing residue.

6. A process for cracking hydrocarbons employing the catalyst produced by the process of claim 5.

References Cited by the Examiner

UNITED STATES PATENTS 2,935,463  5/60  Secor et al. _____ 208—120
3,116,973  1/64  Haden _____ 23—182

ALPHONSO D. SULLIVAN, *Primary Examiner.*

UNITED STATES PATENT OFFICE
CERTIFICATE OF CORRECTION

Patent No. 3,210,266 October 5, 1965

Malden W. Michael et al.

It is hereby certified that error appears in the above numbered patent requiring correction and that the said Letters Patent should read as corrected below.

Column 1, line 45, for "reaticns" read -- reactions --; lines 45 and 46, for "dehydrogenaton" read -- dehydrogenation --; column 2, line 20, for "deflcient" read -- deficient --; column 4, line 60, for "of" read -- at --; column 5, line 5, for "catalsts" read -- catalysts --; line 46, for "unit" read -- until --.

Signed and sealed this 7th day of June 1966.

(SEAL)
Attest:

ERNEST W. SWIDER
Attesting Officer

EDWARD J. BRENNER
Commissioner of Patents